United States Patent [19]

Norstedt

[11] Patent Number: 4,586,134
[45] Date of Patent: Apr. 29, 1986

[54] COMPUTER NETWORK SYSTEM AND ITS USE FOR INFORMATION UNIT TRANSMISSION

[75] Inventor: Bertil E. Norstedt, Lidingo, Sweden

[73] Assignee: International Business Machines Corp., Armonk, N.Y.

[21] Appl. No.: 580,576

[22] Filed: Feb. 15, 1984

[30] Foreign Application Priority Data

Mar. 4, 1983 [SE] Sweden .................... 8301192

[51] Int. Cl.⁴ .................................. G06F 15/16
[52] U.S. Cl. ............................................ 364/200
[58] Field of Search ............... 364/200 MS File, 200

[56] References Cited

U.S. PATENT DOCUMENTS

4,458,311 7/1984 Clements et al. ............ 364/200

Primary Examiner—Raulfe B. Zache
Attorney, Agent, or Firm—John B. Frisone

[57] ABSTRACT

In a computer network a communication session established between a user node such as a data terminal (31) and an application program (13) in a host processor (1) node defines the communication rules to be used and can be shared by a third user node (32, 175) without a new session establishment operation. Session identifier information (138, 158) is stored in the host processor (1) and in a communication controller (2) when a session is established and this stored information is compared with session shareable fields in information units sent from the session sharing third user node (32, 175) to the application program (13a) in the host processor (1). When the session is established between a primary port (161–163) of the communication controller (2) and an application program (13) in the host, it can be shared on transaction basis by a plurality of data terminals (31-33) in a group (3) of terminals operating as secondary ports (171-173) in the network.

17 Claims, 9 Drawing Figures

COMPUTER NETWORK SYSTEM AND ITS USE FOR INFORMATION UNIT TRANSMISSION

BACKGROUND OF THE INVENTION

(1) Field of the Invention

The present invention relates to a computer network system where a plurality of user stations or data terminals are attached over a data transmission network to one or a plurality of host processors.

(2) Prior Art

An overview of the architecture used in computer networks is given in an article by S. Wecker, "Computer Network Architectures," *Computer*, September 1979. Another similar overview including a description of the SNA (Systems Network Architecture) network is provided in an article by P. E. Green, "An Introduction to Network Architectures and Protocols," in the *IBM Systems Journal*, Vol. 18, No. 2, 1979. In these articles the various available computer networks such as SNA, DNA, ARPANET, etc. are described by means of hierarchical architectural layers, where the lowest layer relates to the physical communication lines interconnecting the various user nodes of the network and where the highest level concerns the conversation per se between the various end users of the network.

Computer network systems have been subject to standardization work by the International Organization for Standardization (ISO) and in a paper by Herbert Zimmerman, "OSI Reference Model—The ISO Model of Architecture for Open Systems Interconnection," IEEE Transactions of Communications, April 1980, the architecture described includes seven layers: physical, data link, network, transport, session, presentation and application layer. The present invention concerns primarily the session layer, which relates to the establishment, termination and control of a session between two end users of a network.

In an IBM SNA (Systems Network Architecture) network, a plurality of information units are circulating in the network between pairs of end users when sessions have been established between such pairs. These information units are of various types and hierarchical levels according to the various layers they are representing. A description of such information units and their use in established sessions is provided in an article by James D. Atchins, "Path Control: The Transport Network of SNA," IEEE Transactions on Communications, April 1980.

The extensive growth and use of data networks in today's society has opened up a number of new possibilities in modern data communication technology.

On data networks there are many more parties, capable of communicating with one another than on networks built with leased lines.

There are also many applications, requiring communication between two parties only during a short interval of time, for example, seat reservation and banking applications.

In this environment a large amount of computer resources would be required to perform the computer session establishment function for the individual pairs to communicate with one another. The Nordic Public Data Network, as described in the publication, "The Public Data Networks in the Nordic Countries," published in March 1978 by the Swedish PTT, is an example of a computer network using switched lines (circuit switching).

SUMMARY OF THE PRESENT INVENTION

The present invention as claimed is intended to overcome the drawbacks of the known computer network systems.

According to a preferred embodiment of the present invention, a plurality of independent terminals are grouped into one unit, which is viewed and defined by a host computer in the network as a virtual terminal unit. A number of similar or different sessions are defined and established between applications in the host computer and the virtual terminal.

These sessions are shared by all physical terminal units in the group.

According to another embodiment of the invention, a session established between an end user at one node of the computer network and an application program in a host processor will be recorded as a shareable session which can be shared by a second end user at other nodes without a new session establishment procedure.

According to still another embodiment of the invention, one or a plurality of sessions between a host processor application program and data terminals are offered in host processor ports of a data network, to be shared by terminals operating as secondary port stations in the network.

An advantage of the invention is that time and resource consuming session establishment procedures in a computer network will be decreased.

Another advantage of the invention is that the response time for a data terminal calling a computer application program will be decreased.

The present invention is especially advantageous in such environments where a large amount of short transaction type messages are circulating in a computer network between end users and where the session establishment time is considerable as compared to the total processing time in a session.

The invention will now be described in an environment which is substantially based upon the IBM SNA architecture; however, the invention is not restricted to any specific type of network. A typical SNA network is described in the IBM manual, "Advanced Communication Functions for Virtual Telecommunications Access Method," GC27-0463-2, February 1981.

A detailed description of the invention will now be given with reference to the accompanying drawings, wherein:

Figure 1:
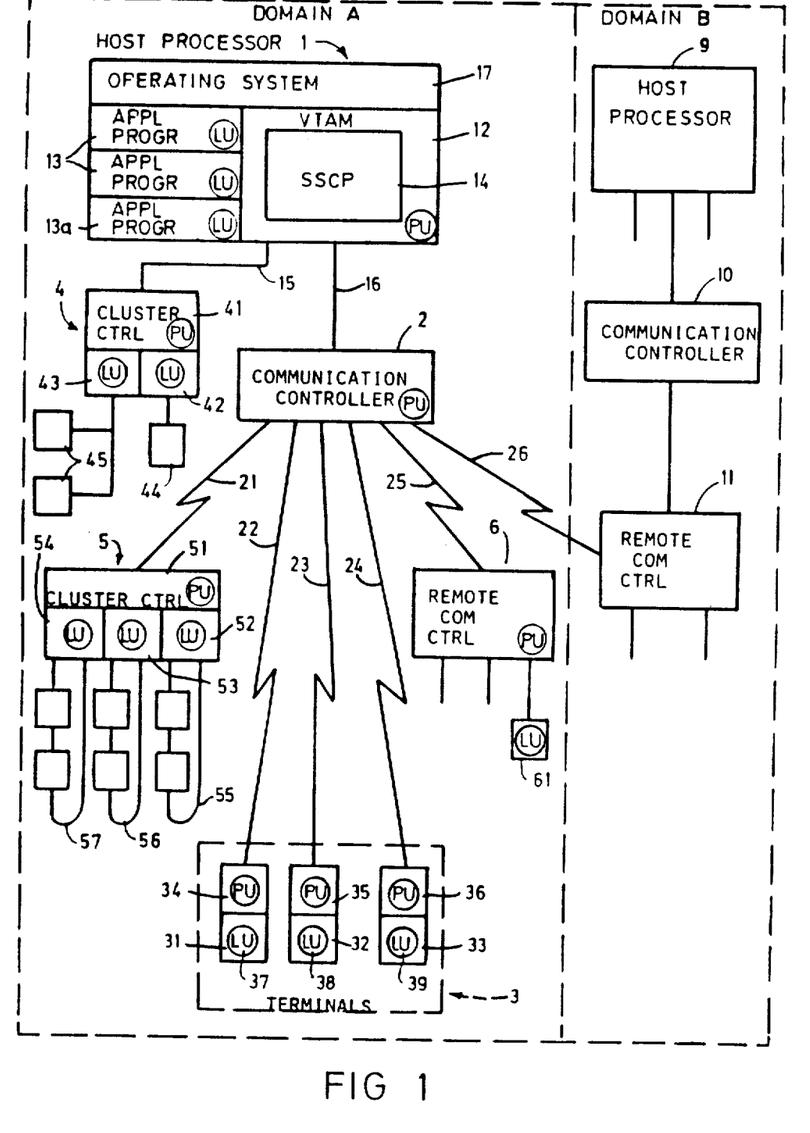
FIG. 1 discloses a block diagram of a computer network system according to the present invention.

In FIG. 1 a computer network includes a host processor 1 located in a domain A and a host processor 9 located in a domain B.

A communication controller 2 is attached to the host 1 via a channel 16 and a local cluster controller 4 is attached over a channel 15 to the host. The communication controller 2 is connected to a remote cluster controller 5 over an SDLC (synchronous data link control) link 21. The communication controller 2 is also connected over a link 25 to a remote communication controller 6 and by means of links 22-24 to terminals 31-33 forming a terminal group 3. A cross-domain link 26 connects the communication controller 2 with a remote communication controller 11 in domain B. In domain B there is also shown a communication controller 10 connected between the host processor 9 and the remote communication controller 11.

The host processor 1 includes an operating system 17, a plurality of application programs 13 and a Virtual Telecommunications Access Method (VTAM) 12 comprising a System Services Control Point (SSCP) component 14.

Each element in the network of FIG. 1 that can send or receive data is assigned a network address and is known as a network addressable unit (NAU). The network address uniquely identifies the element, regardless of whether the element is a device, such as a terminal or a terminal control unit, a program such as an application program in a cluster controller or in a host processor, or a portion of an access method, such as a VTAM. The network address contains the information necessary to route data to its destination. Three types of network addressable units are defined: system services control point (SSCP), physical units (PU) and logical units (LU).

The system services control point (SSCP) 14 in the host processor 1 is the component of VTAM that manages the network. The SSCP performs functions such as bringing up the network and shutting it down, assisting in establishing and terminating communication between network addressable units, and reacting to network problems, such as failure of a link or a control unit. To perform these functions, the SSCP must be able to communicate with physical units and logical units in the network under its control.

A physical unit (PU) is shown in FIG. 1 as an encircled PU. It is a portion of a device, usually programming or circuitry or both, that performs control functions for the device in which it is located and, in some cases, for other devices that are attached to the device that contains the PU. For the devices under its control, the physical unit takes action during activation and deactivation, during error recovery and resynchronization, during testing, and during gathering of statistics on the operation of the device. Each device in the network is associated with a physical unit. In the local cluster controller 4 there is a physical unit 41 and in the remote cluster controller 5 there is a physical unit 51. There are also physical units in the local communication controller 2 and in the remote communication controller 6.

A logical unit is a device or program by which an end user, a terminal operator or an input/output mechanism, gains access to the network. A logical unit can be built-in logic or programming associated with a terminal subsystem or standalone device, or an application program. To the network a logical unit is the source of a request coming into the network. But a logical unit may or may not be the original source. The contents of the request or the information on which the request is based may have originated at a device controlled by the logical unit. Similarly, the network sees a logical unit as a destination of a request unit (RU).

In FIG. 1 a logical unit is shown as an encircled LU. In the host processor 1 there are shown a plurality of application program logical units 13. In the local cluster controller 4 there are two logical units 42 and 43 controlling the devices 44 and 45. In the cluster controller 5 there are logical units 52-54 controlling the device on loops 55-57. In a conventional terminal group 3 there are physical units and logical units for each terminal. These physical units are marked 34-36 and the logical units 37-39.

The purpose of the network according to FIG. 1 is to establish and control communication between two logical units in the network and the corresponding end users. As an example, such communication could be established between the terminal 32 over the link 23, the communication controller 2, the channel 16, VTAM 12 and an application program 13 in the host processor 1.

Figure 2:
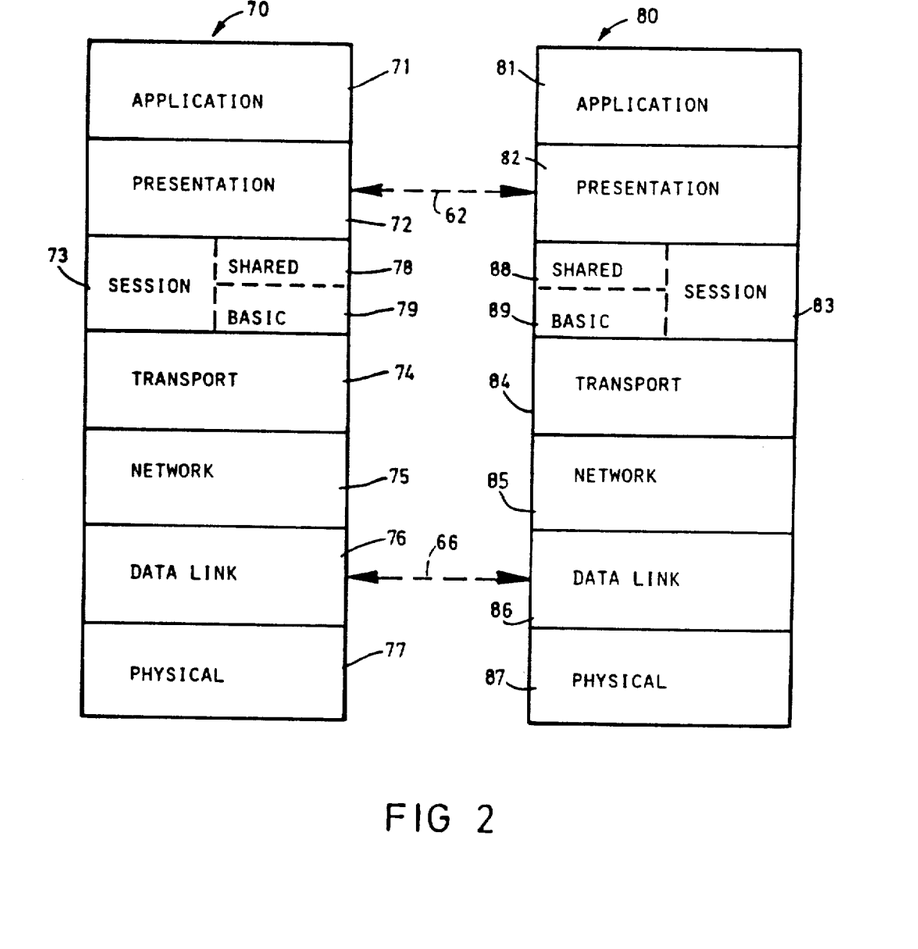
FIG. 2 illustrates the architectural layers arranged according to the present invention.

Before the operation of FIG. 1 will be further described, reference is made to the architectural layers disclosed in FIG. 2. According to the cited article, "OSI Reference Model," by Herbert Zimmerman, a structure of seven layers is shown. The highest layer is the application layer 71 followed by the presentation layer 72, the session layer 73, the transport layer 74, the network layer 75, the data link layer 76 and the physical layer 77. This layered structure 70 represents one part amongst two communication partners communicating over the network. A structure 80 including the corresponding layers 81-87 represent the second part of the communication. Two corresponding layers such as the presentation layer 72 and the presentation layer 82 can be considered to communicate over a peer-to-peer level 62. Similarly, the data link layer 76 can be considered to communicate with the data link layer 86 over another peer-to-peer connection 66.

The meaning of the various layers can roughly be described as follows. The application layer relates to the conversation per se between two end users. The presentation layer defines the type of presentation of data for such a conversation, i.e., presentation such as display, print, etc. The session layer relates to the establishment and control of a session between two end users for conversation purposes. The transport layer provides control from user node to user node across the network, whereas the network layer defines the control between two adjacent nodes within the network. The data link layer relates to the protocol used for data transfer over the link between two nodes whereas the physical layer concerns the electrical characteristics and signaling needs required for a connection.

The present invention concerns mainly the session layers 73 and 83 and their peer-to-peer protocols. According to the present invention, session sharing will be used to reduce the access and response time in the network. When the network is working in a session sharing mode, the session layer 73 will be split into a higher shared session layer 78 and a lower basic session layer 79.

The network of FIG. 1 relates to the System Network Architecture (SNA) whereas the layered structure of FIG. 2 relates to the ISO model. In the SNA architecture there are only six layers as follows: end user, presentation, transmission and data flow, path, data link, and physical. The functions of the session layer of the ISO model are embedded partly in the transmission and data flow layer and partly in the path control layer of the SNA architecture.

Figure 3:
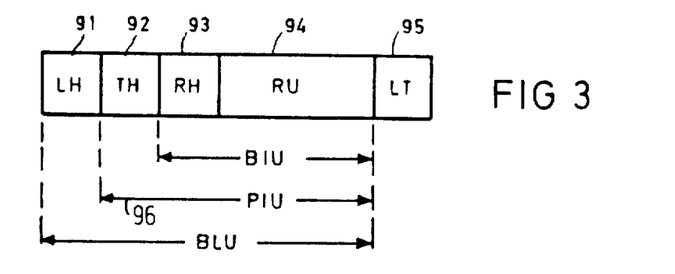
FIG. 3 illustrates a basic link information unit.

The data flow between various nodes in the network of FIG. 1 is comprised of a plurality of information units as shown in FIG. 3. The request-response unit (RU) 94 and a request-response header (RH) 93 constitutes the basic information unit (BIU) traveling from one end user node to another end user node in the network. A transmission header (TH) 92 is physically located in front of the BIU and guides the unit through the network. The transmission header comprises address information and other necessary information for transmission control. A request-response unit RU provided with a response request header (RH) and a transmission header TH is called a path information unit (PIU) 96. When such an information unit is sent from one node in the network over a data link to another node, a link header (LH) 91 is added in front of the unit and a link trailer (LT) 95 is attached to the end of the unit. This builds up a basic link unit (BLU) as shown in FIG. 3. A basic link unit comprises one or several PIUs.

Before the two domains A and B of the network in FIG. 1 can be used, the operator of the host processor 1 must start VTAM 12 of the domain A and the operator of the host processor 9 must start the corresponding access method of the domain B. Such an initialization of a domain with an operator command will activate some or all of the resources in the domain. This means that sessions will be established between the SSCP 14 and the various PUs and various LUs in the domain.

It is assumed that an end user of the LU 52 in the cluster controller 5 in FIG. 1 wants to communicate with an application program 13, say the application program 13a in the host processor 1. Before such a communication can be established, a session must be established between the LU 52 in the cluster controller 5 and the LU 13a in the host processor 1. The session establishment starts by the LU 52 sending a logon request over the link 21, the communication controller 2 and the channel 16 to the SSCP 14 in the host processor 1. Such a request contains node identification information and also a suggestion of session parameters to be used for the communication. Session parameters enable each end of the session to know what the other end will do in different communication situations. The session parameters are a string of bit settings that indicate the rules to be followed in the session for such things as request and response sequences, resolution of contention, use of request chaining, use of brackets, and use of change-direction indicators. The host processor 1 might agree or might change the suggested session parameters. A logon mode table in VTAM 12 is sued for checking session parameters. The host processor 1 will then send a "Bind" request from VTAM 12, over the channel 16, the communication controller 2 and the link 21 to the LU 52 for the cluster controller 5, thus establishing a session between the LU 52 and the LU 13a in the host processor 1. A session has now been established and the two end users of the two LUs can now communicate request-response units of the type shown in FIG. 3. When the communication is completed, the session will be terminated by either side of the communication.

When a group 3 of terminals 31-33 are frequently exchanging short transactions with an application program such as the application program 13a in the host processor 1, the non-productive session establishment and session termination procedure between the terminal LUs and the application program LU will heavily load the host processor 1. According to the present invention, such an unproductive overhead will be extensively reduced by assigning a group address to the terminal group 3. VTAM 12 will then view the terminal group 3 as one single node, as a virtual terminal in the network and will use the group address for communication with the terminals in the group.

The communication between the terminal group 3 and the application program 13a in the host processor 1 is started by a conventional session establishment procedure between one terminal, say terminal 31 in the group and the application program 13a. When the session is initiated, the communication controller 2 stores both the group address of the group 3 and the terminal address of the terminal 31 and transmits the group address as an origin address over the channel 16 to VTAM 12. When a session has been established between the terminal 31 and the application program 13a, another terminal such as the terminal 32 may join or share this session. PIUs (FIG. 3) exchanged between the terminals in the group 3 and the application program 13a are routed into one single buffer area for one single session in VTAM 12. The PIUs received over the channel 16 from VTAM 12 to the communication controller 2 contains the group address in the transmission header 92 according to FIG. 3, whereas the terminal address is embedded into the request unit 94. The communication controller 2 will then distribute the information units according to the terminal addresses.

It is important that a session has been established between the terminal group 3 and the application program 13a in the host processor 1 before session sharing can be used. If one terminal, say the terminal 33, is sending a request unit at a time when no session has been opened, VTAM 12 will analyze this request unit and finds that there is no session opened. VTAM 12 will then return a response unit having certain condition indicators set, telling the terminal 33 that there is no session established. The terminal 33 will then initiate a session by sending a conventional logon request, whereafter the other terminals might share this new session.

Session sharing is possible between the terminals in the group 3 only as long as the various terminals are using the same session parameters for the communication. If one terminal or if the application program wants to use different session parameters, a new session must be established. Since VTAM 12 sees only one terminal in the group 3, this means that the old session must be terminated before the new session can be established. Another terminal can then share the new session by adapting its communication to the new session parameter conditions.

The session sharing procedure just described is transparent to VTAM 12 and is mainly handled on a lower level by the communication controller 2. According to another embodiment of the present invention, session sharing is handled on the VTAM level. It is assumed as an example that LU 52 in the cluster controller has established a session with the application program 13a in the host processor 1. It is also assumed that a LU 61 attached to the remote communication controller 6 intends to join this session on a session sharing level. The data traffic between the host processor 1 and the LU 52 in the cluster controller 5 flows over the link 21, the communication controller 2 and the channel 16. The data traffic between the LU 61 and the application program in the host processor 1 flows over the remote controller 6, the link 25, the communication controller 2 and the channel 16. According to the SNA architecture a transmission header 92 for a path information unit (PIU) in FIG. 3 passing the link 21 has a format FID 2 according to FIG. 4. The transmission header of the format FID 2 includes a format identification field 101, a destination address field 102, an origin address field 103 and a sequence number field 104. A PIU travelling along the link 25 and along the channel 16 has a format FID 1 according to FIG. 4. The transmission header of the format FID 1 includes, in addition, a data count field 105.

Figure 4:
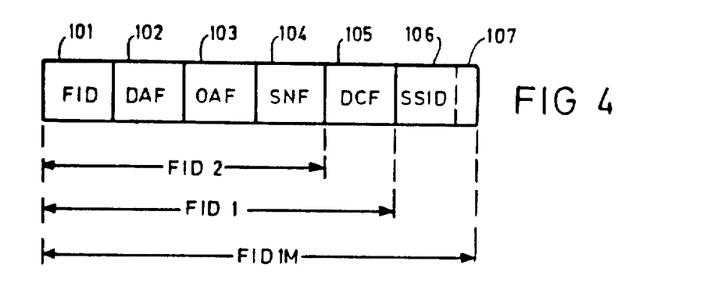
FIG. 4 illustrates a first example of a transmission header.

The LU 61 is enabled to share an active session between the LU 52 in the cluster controller 5 and the LU 13a in the host processor 1 by modifying the transmission header FID 1 in FIG. 4. A session identifier field 106 is used for the LU 52–LU 13a session and is added to the transmission header. This field includes a flag bit 107, which when set, indicates that the transmission header represents a shareable session information unit. The other bits in the SSID field 106 uniquely define and name the established session between the LU 52 and the LU 13a. VTAM 12 stores the session identifier field 106 in a session identifier table (138, FIG. 6). When the LU 61 joins this previously established session, modified transmission headers of the type shown in FIG. 4, i.e, FID 1M must be used with the field 106 marked with the same bits as for the established main session between LU 52 and LU 13a. When such a PIU is received by VTAM 12 from LU 61, the destination address field 102 is the same as for the main session initiated by the LU 52, i.e., the address of the application program LU 13a. The origin field 103 is, however, different, it is the address of the LU 61. VTAM 12 then looks into the field 106 and finds the session sharing bit 107 to be on. It will then compare this field 106 with stored information in the session identifier table and will find a corresponding session identifier for the session originated in the LU 52. Therefore, a request unit transmitted with such a PIU will be passed to the same receiving buffer queue in VTAM as if it would have been received from the original LU 52.

The invention will now be described in more detail with reference to FIGS. 5, 6 and 7 for a switched data network, such as the Nordic Public Data Network.

Figure 6:
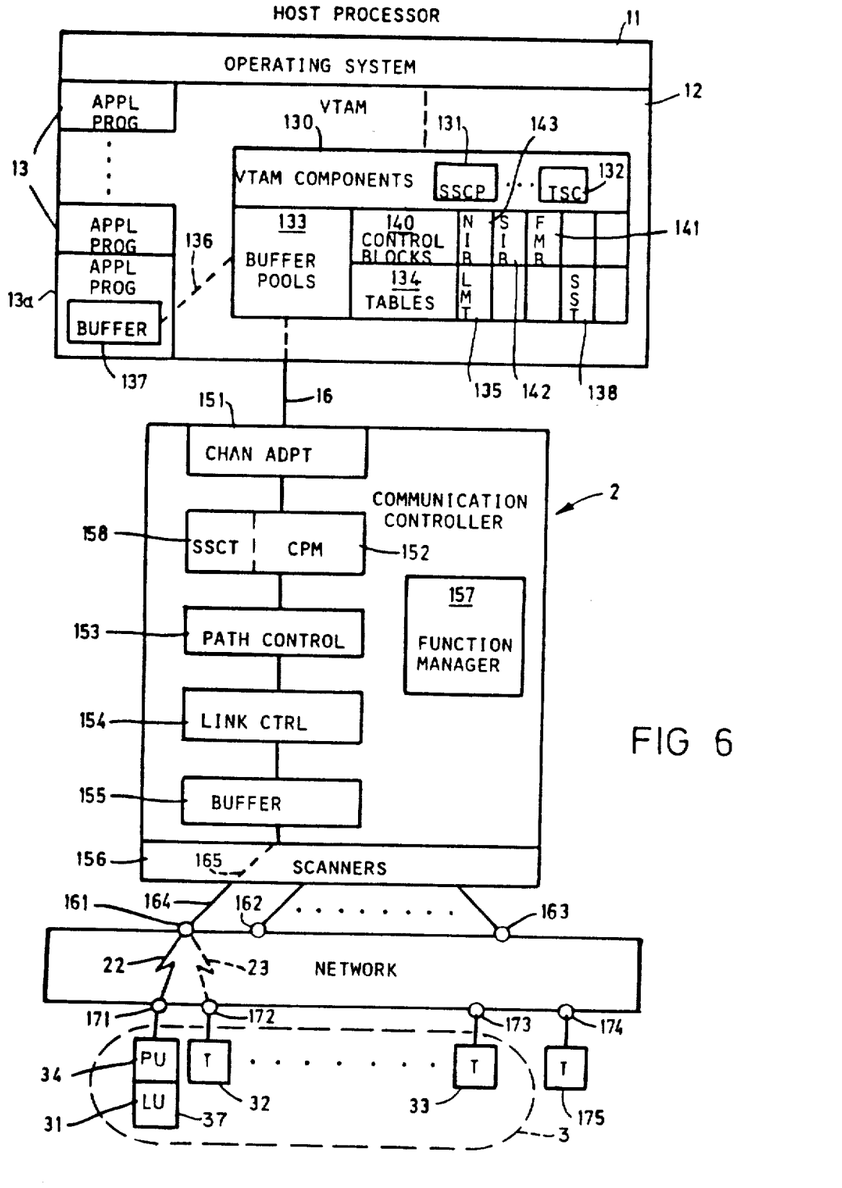
FIG. 6 is a block diagram of a computer network including switched lines.

In FIG. 6 there is shown a terminal group 3 including terminals 31, 32 and 33, each connected to a corresponding port 171, 172 and 173. These ports are preferably standardized X21 ports, according to the CCITT recommendation, to be connected over a switched data network to other existing X21 ports 161, 162 and 163. Another terminal or terminals 175 with its port 174 represent other terminals of the network which do not belong to the group 3. It is assumed that terminals 31-33 and 175 are provided with automatic calling units. The terminals 31-33 and 175 with the ports 171-174 represent the secondary side of the network whereas the primary side is represented by the ports 161-163 connected to the communication controller 2.

A session can be established between a secondary terminal 31 and a primary application program 13a for exchanging path information units (PIU) between the two end users of such a session. A path will then exist between the terminal 31 and the application program 13a as follows: terminal 31, the port 171, a link 22, a port 161, a line 164, a line 165 in a scanner 156 in the communication controller, a buffer 155 in the controller, a link control 154 in the controller, a path control 153 in the controller, a connection point manager 152 in the controller, a channel adapter 151 in the controller, a channel 16, buffer pools 133 in the host processor 1, interface 136 between the buffer pools 133 and the application program 13a and a buffer 137 in the application program 13a.

Figure 5:
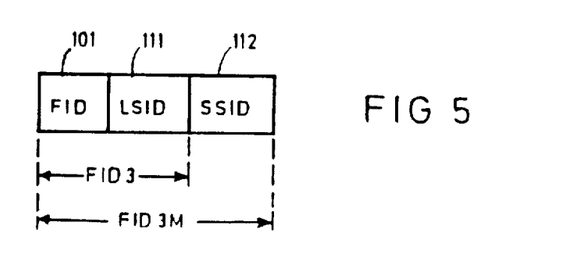
FIG. 5 illustrates a second example of a transmission header.

A PIU sent from a terminal 31 towards the application program 13a is provided with a transmission header 92 according to FIG. 3 and has a format as shown in FIG. 5. Such a transmission header is of a format type FID 3 and includes a format identifier field 101 similar to the field 101 in FIG. 4. It also includes a local session identifier field 111 which uniquely identifies the terminal 31 to the communication controller 2. According to the present invention, the conventional transmission header FID 3 used in SNA architecture is modified by the field 112 comprising a shared session identifier field. This field includes a bit which is on when shared session facility is used. It also includes information about the main session which is shareable.

When a PIU sent from the terminal 31 has passed the switched network, the scanner 156, the buffers 155 and the link control 154 in the communication controller, it will reach the path control 153 and thereafter the connection point manager 152 in the communication controller. The path control 153 will change the transmission header of this PIU from the modified format FID 3M of FIG. 5 to the modified format FID 1M in FIG. 4 whereby the contents of the field 11 in FID 3M will be transferred to the field 106 in FID 1M. This new transmission header FID 1M will enable VTAM 12 to route the PIU coming from the channel adapter 151 and the channel 16 to the host processor. This routing is performed by a transmission subsystem component 132 in VTAM 12.

When VTAM 12 is started in a domain such as in the domain A in FIG. 1, a number of sessions will be established between the system services control point (SSCP) 14 and the various PUs and LUs in the domain. These sessions are established by means of VTAM requests such as "Activate PU" and "Activate LU." An activated LU might then establish a session with an application program LU in the host processor as described in connection with FIG. 1. This is, however, not true for resources such as terminals which are connected over switched lines to the host processor. Such terminals are not activated during the domain initialization time. A session initialization between a terminal over a switched line with a host application program is therefore much more complicated and time-consuming than session initialization over leased lines.

Figure 7:
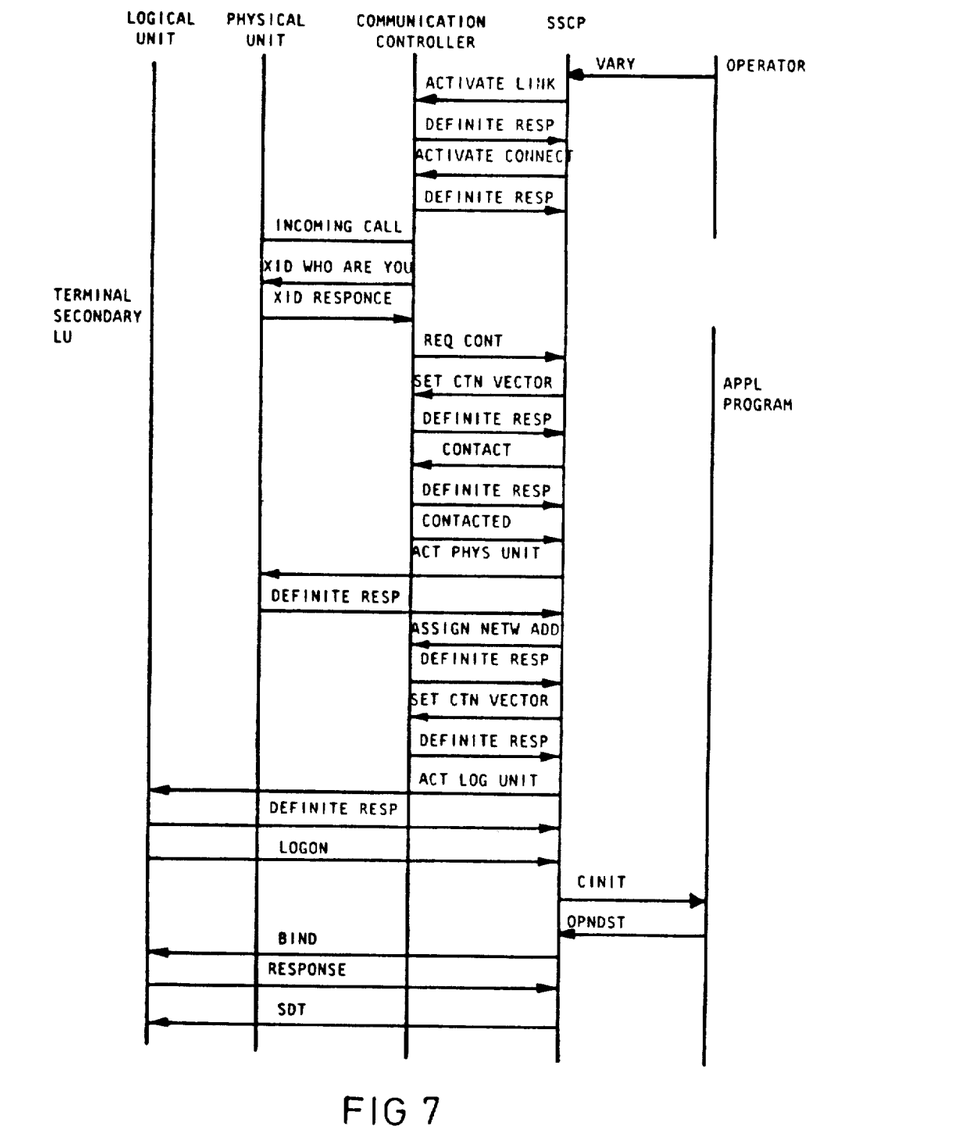
FIG. 7 is a functional diagram illustrating session establishment sequences for switched lines.

FIG. 7 is a schematic diagram for a session establishment procedure in a switched data network as shown in FIG. 6.

The operation starts with the network operator issuing a "Vary" command from the operator console in the host processor 1. The "Vary" command will be processed by the SSCP component 131 in VTAM 12. SSCP 131 will then send an "activate link" request (RU) to the communication controller 2. Communication controller 2 answers by a "definite response" RU to the SSCP 131. SSCP 131 then sends an "activate connect in" RU to the communication controller 2 which answers with a "definite response" RU. The communication controller 2 is now ready for receiving incoming calls from the terminals over the switched network.

It is assumed that the terminal 31 in the group 3 in FIG. 6 wants to establish a session with an application program 13a in the host processor 1. It will then use its automatic calling unit to call one of the ports of the communication controller 2, say the port 161. A connection link 22 will then be established between the secondary port 171 of the terminal 31 and the primary port 161 of the communication controller 2. Such an incoming call is shown in FIGS. 6 and 7 as coming from the physical unit 34 of the terminal to the communication controller 2. The incoming call is answered by the communication controller 2 by a "Station Identification Request" RU "XID Who are you?", which will be sent to the physical unit 34. The physical unit 34 answers by sending its identification "XID response" to the communication controller 2.

A conversation will now start between the communication controller 2 and the SSCP 131 in the host processor 1. Communication controller 2 will send a "request contact" which is an off-hook RU to the SSCP. The SSCP answers with a "Set Control Vector" RU to the communication controller 2. This RU defines certain conditions for the session to be established between the PU 34 and the SSCP 131. The communication controller 2 answers by a definite response to the SSCP 131. SSCP 131 then sends a "Contact" RU to the communication controller 2. The communication controller 2 answers with another "definite response" followed by a "contacted" RU.

SSCP 131 will now send an "Activate Physical Unit" RU to the physical unit 34 which activates this unit. The physical unit 34 will return a "definite response" to the SSCP 131.

Next, SSCP 131 sends an "assign network address" RU to the communication controller 2, which answers by a definite response. The SSCP then sends a "set control vector" RU to the communication controller which answers with a "definite response." This control vector is for the LU 37 in the terminal 31. The SSCP 131 proceeds to send an "activate logical unit" RU to the logical unit LU 37 in the terminal 31. This activates the logical unit in the terminal 31 which answers with a "definite response" RU to the SSCP. This ends the procedure for establishing a session between the system services control point 131 in VTAM 12 and the physical unit 34 and another session between the SSCP 131 and the logical unit 37 in the terminal 31. A session might now be established between the LU 37 and an application program such as the application program 13a in the host processor 1 as if the terminal 31 would have been attached to the host processor over non-switched lines.

A session is initiated by the logical unit 37 sending a "logon" RU to the SSCP 131. This logon request includes a set of parameters suggested to be used for the session to be established. The SSCP will send a "control initiate" (CINIT) request to the application program 13a, which will act as a primary LU in the session. The primary LU 13a answers by issuing a macro instruction "OPNDST" to the SSCP 131. When this macroinstruction is executed by VTAM 12, the session parameters provided by the logon request will be checked against a logon mode table (LMT) 135 in a table area 134 in VTAM 12 in FIG. 6. A number of control blocks in a control block area 140 will be established, such as a node identifier control block (NIB) 143, which identifies the secondary node of the session to be established, i.e., the LU 37. A session identifier control block (SIB) 142 defining the current session will also be established and a function management control block (FMB) 141 for this session.

SSCP 131 will send a "Bind" RU to the secondary logical unit 37. This Bind RU might contain the same session parameters as the original logon request or it might contain session parameters which have been changed by VTAM 12. The secondary LU 37 will then send a response accepting or rejecting these session parameters. If the session parameters are accepted, the SSCP 131 will send a "start data traffic" RU to the secondary LU 37. A session has now been established between a secondary LU 37 and a primary LU 13a.

When a PIU having a transmission header of type FID 3 according to FIG. 5 is received by the path control 153, FIG. 6, from the terminal 31, it will change the transmission header to the format FID 1 according to FIG. 4, as described previously. This PIU will be sent over the channel 16 to the host processor 1 and is routed by the transmission subsystem component 132 to a specific buffer area in the buffer pools 133 defined by the FMB block 141. The RU 94 of the PIU 96 (FIG. 3) will then be transferred from the VTAM buffer 133 to the application program buffer 137. Similarly, an RU from the application program buffer 137 will be transferred to the VTAM buffer 133 assigned by the FMB block 141 and will be built into a PIU by the TSC component 132 adding a transmission header 92. The TSC component 132 will then route this PIU to the communication controller 2 and to its connection point manager 152 and further to the path control 153. The path control 153 will then change the transmission header of the format FID 1 into the format FID 3 for further transfer to the terminal 31.

The session establishment procedure described can be used for establishing a session between a host application program and a group of terminals 3 in FIG. 6. This means that when a session is established between the terminal 31 and the application program 13a the content of the session sharing identifier field 112 in the modified transmission header FID 3M in FIG. 5 will be stored in a session sharing control table (SSCT) 158 in the connection point manager 152 of the communication controller 2. Another terminal 32 may then share this established session by using the same SSID information 112 in its transmission header when it sends a PIU to the application program 13a. This SSID information is compared to data stored in the SSCT 158 for routing the PIU to the same destination as for the main session. Such a session sharing is made on the communication controller level. The PIUs exchanged between the communication controller 2 and the host processor 1 will use the group address for the terminal group 3 in the origin address field 103 (FIG. 4) of their transmission headers 92 (FIG. 3).

When a station outside the group 3, such as a terminal 175, is sharing an established session, the SSID information in the field 106 of a transmission header for the main session, say terminal 31-application program 13a, must be stored in a session sharing table SST 138 in VTAM 12. A PIU traveling from the terminal 175 along a shared session towards the application program 13a will be routed to its destination buffer in VTAM 12 by the transmission subcomponent 132 comparing the SSID information in the PIU with stored information in the table 138. If there is a list entry defining a main session, the RU part of this PIU is queued into the VTAM buffer 133 assigned previously to the corresponding main session.

Figure 8:
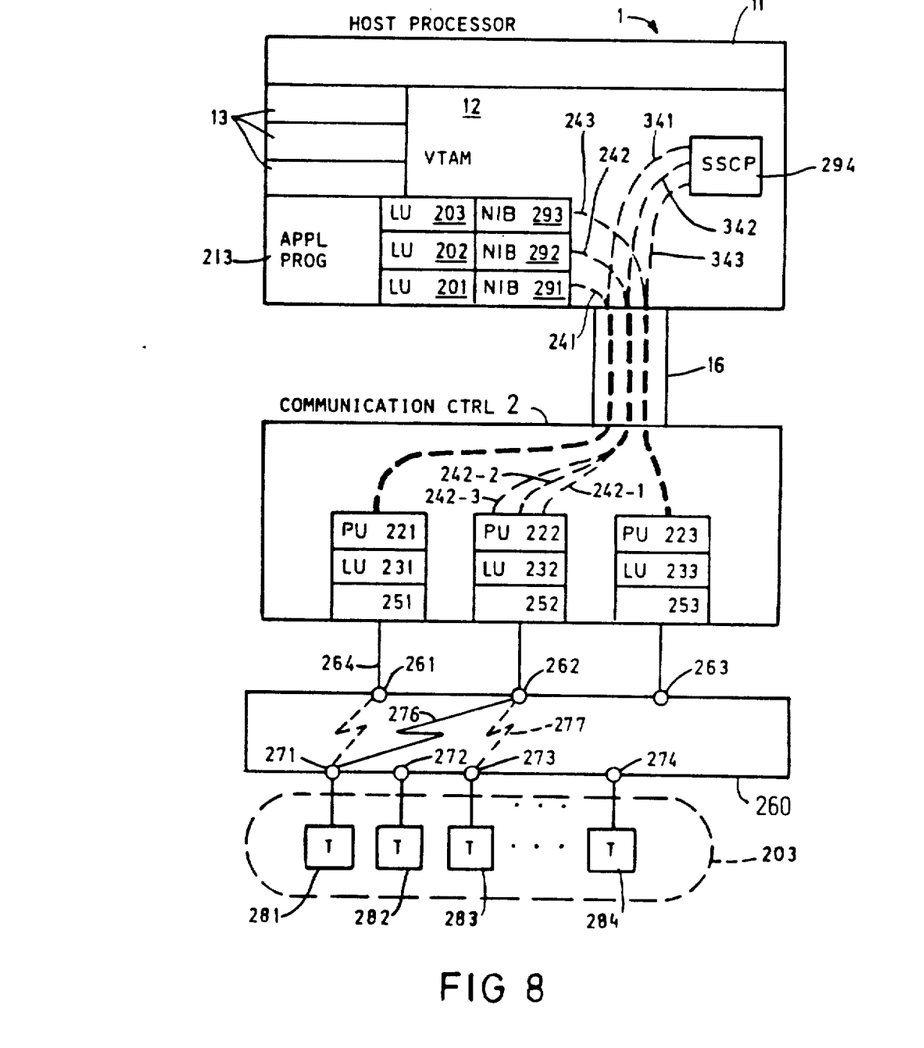
FIG. 8 illustrates another embodiment of a computer network including switched lines.
Figure 9:
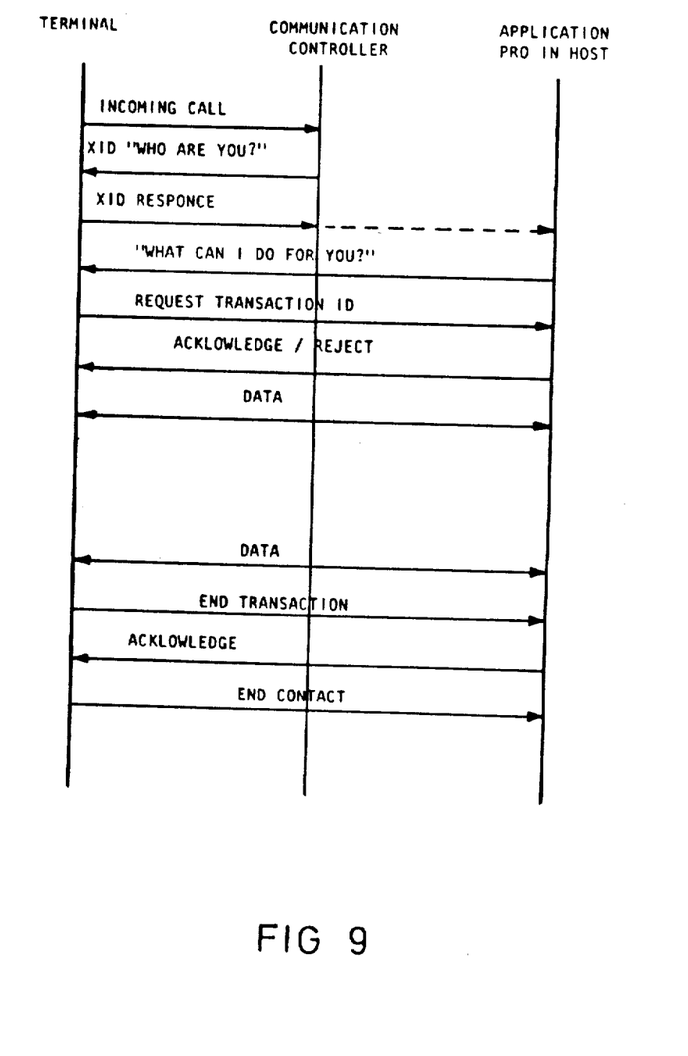
FIG. 9 is a functional diagram for the operation of the network in FIG. 8.

FIGS. 8 and 9 disclose another embodiment of the present invention.

According to FIG. 8, a host processor 1 is attached over a channel 16 to a communication controller 2. A plurality of terminals 281-284 are each attached to corresponding secondary ports 271-274 in a switched data network 260, such as the Nordic Public Data Network. A plurality of primary ports 261-263 of the network 260 are attached to primary ports 251-253 of the communication controller. The ports 261-263 are preferable standardized X21 ports.

An example of the communication controller 2 is the IBM type 3705 controller described in the manual, "IBM 3704 and 3705 Communications Controllers, Principle of Operations," GC30-3004-6, October 1979.

An example of the terminals 281-284 is the IBM type 3275 terminal described in the IBM manual, "An Introduction to the IBM 3270 Information Display System," GA27-2739-14, February 1982.

It is assumed that the terminals 281-284 represent a large number of terminals to be used for communication with an application program 213 in the host processor 1 on a transaction basis. The transactions to be sent over the network are rather short messages; however, the frequency of transaction occurrences is high. In a conventional data network such a transaction traffic would need an extremely high amount of session establishments and terminations resulting in a very high host processor overhead time as compared to the useful processing time of the transactions. The solution to such a traffic problem will be a session sharing system according to the present invention.

A plurality of parallel sessions 241-243 will be established between primary half sessions (the primary part of a session) 201-203 of the application program 213 and secondary half sessions (the secondary part of a session ) 231-233 for the communication controller ports 251-253. These sessions will be enabled by sessions 341-343 established between the System Services Control Point (SSCP) 294 in the host processor and physical units 221-223 for the ports 251-253 in the communication controller 2 and similar sessions between the SSCP 294 and the logical units 231-233 for these ports. Each half session on the primary side for the application program 213 will include a node identifier block (NIB) 291-293. In the example of FIG. 8, there are shown three parallel sessions 241-243 between the application program 213 and three ports 251-253 in the communication controller. It is, of course, obvious for one skilled in the art that any other number of parallel sessions and ports can be used.

An example of sessions established between communication controller output ports and a host processor application program is shown in the IBM manual, "IBM X.25 NCP Packet Switching Interface," GC30-3080-1, June 1982.

The terminals 281-284 are viewed as a terminal group 203 where all terminals are of a similar type and are using the same session parameters. The terminals 281-284 and their secondary ports 271-274 are to be connected to the primary ports 261-263 by using a group dial number. This means that the terminal 281 for the port 271 will dial a group number for connection establishment to a primary port, which might lead to a connection 276 between the ports 271 and 262. If the port 262 would be occupied, say by a connection 277, the port 271 might succeed to be connected to the port 261, which is attached over the line 264 to the communication controller port 251.

The data traffic between one terminal, say the terminal 281 in FIG. 8 and the host processor 1, will now be described with reference to FIG. 9. It is assumed that the terminal 281 is calling the communication controller 2 over the network 260 using the group dial number for the ports 261-263 and that it succeeds in reaching port 262 over the connection link 276. Such an "incoming call" in FIG. 9 is answered by the communication controller by a station identifier request XID, "Who are you?". The terminal will then respond with an "XID response, which will identify its station address to the communication controller and further to the application program 213, using the session 242 previously established between the application program 213 and the port 252 in the communication controller 2. The application program in the host will then send a "What can I do for you?" request whereafter the terminal answers with a "request transaction ID." This transaction request includes identification information such as a password. The request will be answered by the application program by sending an acknowledgment or a rejection of the transaction. In case the acknowledgment is positive, a data exchange will start between the terminal 281 and the application program 213 using the previously established session between the application program 213 and the port 252, which session is shown as the session 242 in FIG. 8. When the transaction is completed, the terminal will send an "end transaction" message to the application program 213 which answers with an "acknowledgment." The terminal 281 will then break the connection 276 after it has sent an "end contact" request to the application program in the host.

As an example the data network system according to FIG. 8 and FIG. 9 can be used for a banking application. The application program 213 in the host processor 1 is attached to a data base and the terminals in the terminal group 203 are communicating with such a data base on a transaction basis via the application program 213.

When the network operator starts the network in the morning of a working day, the host processor will first establish the three parallel sessions 241-243 between the application program 213 and the communication controller ports 251-253.

This means that the terminal group 203 is viewed by VTAM 12 in the host processor as three physical units 221-223, three logical units 231-233 and three links 251-253 instead of as one physical unit and one logical unit for each terminal in the group 203. VTAM 12 will also assign network addresses to these three physical and logical units in the communication controller 2.

It should be understood that the system according to FIGS. 8 and 9 will substantially reduce the session establishment and termination overhead as compared to conventional session housekeeping for switched connections. It should be understood that the physical units 221-223 and the logical units 231-233 in the communication controller will be activated in a conventional manner when the network is started by the network operator in the host processor 1 in the morning of a working day. This will establish the sessions 341-343 between the SSCP 294 and said physical and logical units. The parallel LU-LU sessions 241-243 can then be established preferably from the primary host processor side. In such a session establishment procedure the session parameters are negotiable, as in a conventional system, and a conventional "Bind" request is used to decide which session parameters should be used. It can therefore be said that the sessions 241-243 are not fixed but they can be adapted to the type of applications needed for servicing the terminals in the group 203. It is, however, important that all the three sessions 241, 242 and 243 use the very same session parameters at any given time because the terminals in the group 203 are randomly connected to the three ports 261-263.

The duration time T for a session, such as the sessions 241-243, can be up to several hours or more. The time T1 for a session establishment operation is of the order of hundreds of milliseconds. The duration time t for a transaction is preferably a few seconds whereas the actual processing time t1 for a transaction in the host processor is only a few milliseconds. This means that t is at least a magnitude less than T and that t1 is at least a magnitude less than T1.

The present invention reduces the overall response time for the calling terminals because no session establishment time T1 is needed in the processor 1 for each transaction.

The present invention is not restricted to SNA architecture with a strictly centralized control system using a system services control point 294. The control sessions 341-343 could therefore be changed to some other kind of network control system. The essential inventive concept is that one or a plurality of shareable sessions, preferably established according to negotiable session parameter rules, are used for serving a plurality of user stations or terminals.

The present invention is also not restricted to the embodiments described. It is, for instance, within the scope of the invention to establish several parallel sessions 242-1, 242-2, 242-3 . . . in FIG. 8 between a primary LU202 and a secondary LU232 for a port 252. These sessions would be established with different session parameters thus enabling terminals using different session parameters to be connected to the same port. According to such a modification a calling terminal 281-284 should identify his session type, i.e., which parameters and which session amongst the plurality of sessions 242-1 to 242-3 should be used, preferably by a session identifier field 111 or 112, see FIG. 5, in its transmission header for each PIU. The essential inventive idea is that one established session is shared by two or more users.

It is also within the scope of the present invention to establish a plurality of parallel sessions between each primary port and a plurality of application programs 13 respectively. This means that all terminals 281-284 may use any port 261-263 for a connection to any application program 13. Such a system is the most general mode of session and port sharing in the data network.

In such a system each application program 13 amongst a first plurality of application programs would have one session established to each primary port of a second plurality of primary ports 251-253. Each one of a third plurality of secondary data terminals 281-284 are then adapted to call any primary port for transaction exchange with any application program. The network 260 interconnecting the secondary terminal ports 271-274 with the primary ports 261-263 might be either a circuit switching network or a packet switching network. It is only important that an information unit, a PIU reaching a primary port 261-263 from a secondary port 271-274 connected to a secondary terminal 281-284, is provided with session identifier information 111, 112 or 106, FIGS. 4 and 5, in order for the communication controller 2 to route such a PIU into the selected session amongst the sessions branching out from that port, in order to reach the desired application program 13.

Examples of various types of session parameters to be used for various types of sessions is given in the IBM manual, "System Network Architecture Reference Summary," GA27-3136-4, January 1981.

While the invention has been particularly shown and described with reference to the preferred embodiments thereof, it will be understood by those skilled in the art that various changes in form and details may be made therein without departing from the spirit and scope of the invention.

Having thus described my invention, what I claim as new, and desire to secure by Letters Patent is:

1. Computer network system for data communication between a plurality of addressable nodes comprising a plurality of links interconnecting the nodes and at least one host processor (1) for establishing a session between a first (13a) and a second (31) node in the network for exchanging information units (94, 96) between said two nodes in accordance with session parameters defined during a session establishment operation, characterized by means (158, 138) for storing session identifier information and means (132, 152) for comparing said stored session identifier information with a session identifier field (106, 112) in an information unit (96) sent by a third node to the second node (13a) without session establishment between the second node and the third node, whereby an established session between two nodes is shared by a third node.

2. A network according to claim 1, wherein said session identifier storing means comprises a shared session table (158) located in a communication controller (2) attaching the second and third node to the first node located in the host processor (1).

3. A network according to claim 1, wherein said session identifier storing means comprises a shared session table (138) located in a virtual transmission access method (12) of the host processor.

4. A network according to claim 1, wherein said session identifier field (106, 112) is located in a transmission header (92) of an information unit (96) traveling through the network.

5. A network according to claim 4, wherein said session identifier field includes a session sharing mode indicator (107).

6. A network according to any one of the claims 1-5, wherein the first node is an application program (13a) in the host processor (1), the second and third nodes are data terminals (31, 32, 175) attachable over switched lines (22, 23) to a communication controller (2) and thence to the application program (13a) using a single shared session.

7. A network according to claim 6, wherein an information unit (96) sent from one data terminal (31) to the communication controller (2) comprises a first type of transmission header which includes a local session identifier field (111) and a shared session identifier field (112), said transmission header being changed by the communication controller into a second type of transmission header which includes an origin address (103) and a destination address (102) in which the origin address is the network address of a group (3) of session sharing data terminals (31-33).

8. A method for transferring information units in a computer network system including establishing a first session between a first addressable node (13a) in a host processor (1) and a second addressable node (31) in a station attached to the network, the session establishment procedure including defining a set of session parameters amongst a plurality of parameters to be used in the session, said parameters defining the communication rules to be followed by both ends of the session, characterized by sharing the established first session with a third addressable node (32) for exchanging information units (96) between the first node (13a) and the third node (32) without establishing a second session and identifying to the system each information unit sent or received by the third node in the shared session as an information unit related to the established first session.

9. A method according to claim 8, wherein the identification of an information unit is made by comparing session identifier data (106, 112) in a transmission header (92) of the information unit with stored session identifier data (138, 158).

10. A method according to claim 8, wherein the identification of an information unit is based upon the location of the third node in the network.

11. A method for transferring information units in a computer network system comprising at least one host processor (1), a number of addressable primary network ports (251-253, 261-263) connected to the host processor and a plurality of secondary network ports (271-274) each attached to a corresponding data terminal (281-284) and each connected over a switched line (276, 277) to a primary port, including establishing at least one session (242) between at least one primary port (252) and an addressable node (202, 213) in the host processor, said session establishment procedure including defining a set of session parameters amongst a plurality of parameters to be used in the session, characterized by maintaining the established one session (242) between said one primary port (252) and the host node a time T, connecting a first secondary port (271) to said one primary port (252, 262) over a switched line (276) by a call from a corresponding terminal (281), starting a data conversation between said terminal (281) and the host node for a transaction using the previously established one session (242), breaking the line connection (276) after the transaction is completed, the duration time t for the transaction being a magnitude smaller than the duration time T for said one session, and connecting another data terminal (283) via its secondary port (273) to said one primary port (252, 262) before said one session is terminated, for another transaction, whereby a plurality of secondary terminals share one session (242).

12. A method according to claim 11, wherein the primary ports (251-253) are located in a communication controller.

13. A method according to claim 12, wherein a plurality of sessions (242-1, 242-2, 242-3) each defined by a different set of session parameters are established between one primary port (252) and an addressable node (213) in the host processor.

14. A method according to claim 13, wherein a session identifier field (111, 112, FIG. 5) in a transmission header (92) of an incoming information unit (96) for a primary port (252) is used to identify which session (242-2) amongst a plurality of parallel sessions (242-1, 242-2, 242-3) should be used for a transaction.

15. A method for transferring information units between a first plurality of application programs (13, 213) in a host computer and a second plurality of data terminals (281-284) over a third plurality of primary ports (251-253, 261-263) of a data network (260), characterized by establishing parallel sessions between each application program (13, 213) and all primary ports (251-253) respectively and providing session identifier information (106, 111, 112) in each information unit (96) traveling between an application program and a data terminal via said data network.

16. A method according to claim 15 wherein the data network is a circuit switched network.

17. A method according to claim 15 wherein the data network is a packet switched network.

* * * * *